Feb. 1, 1949. W. L. SEMON 2,460,602
APPARATUS FOR FILM-TYPE DISTILLATIONS
Filed May 4, 1945 2 Sheets-Sheet 2
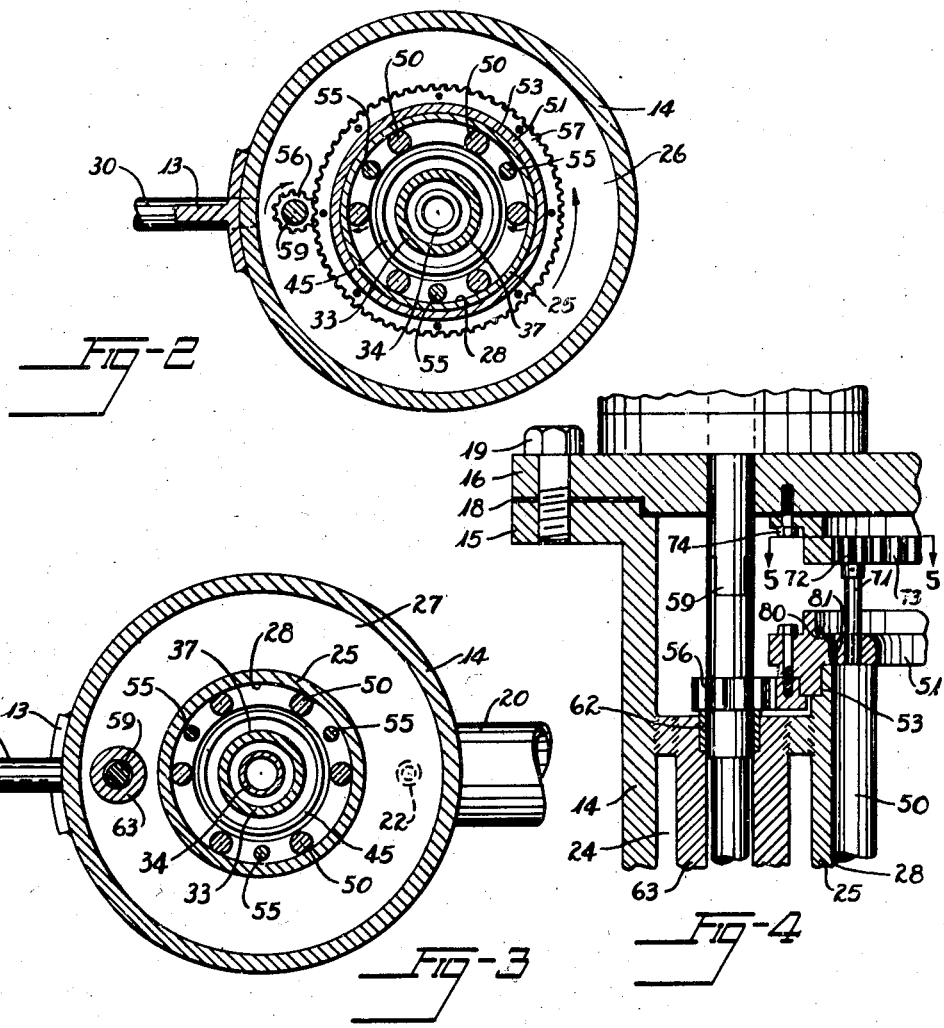

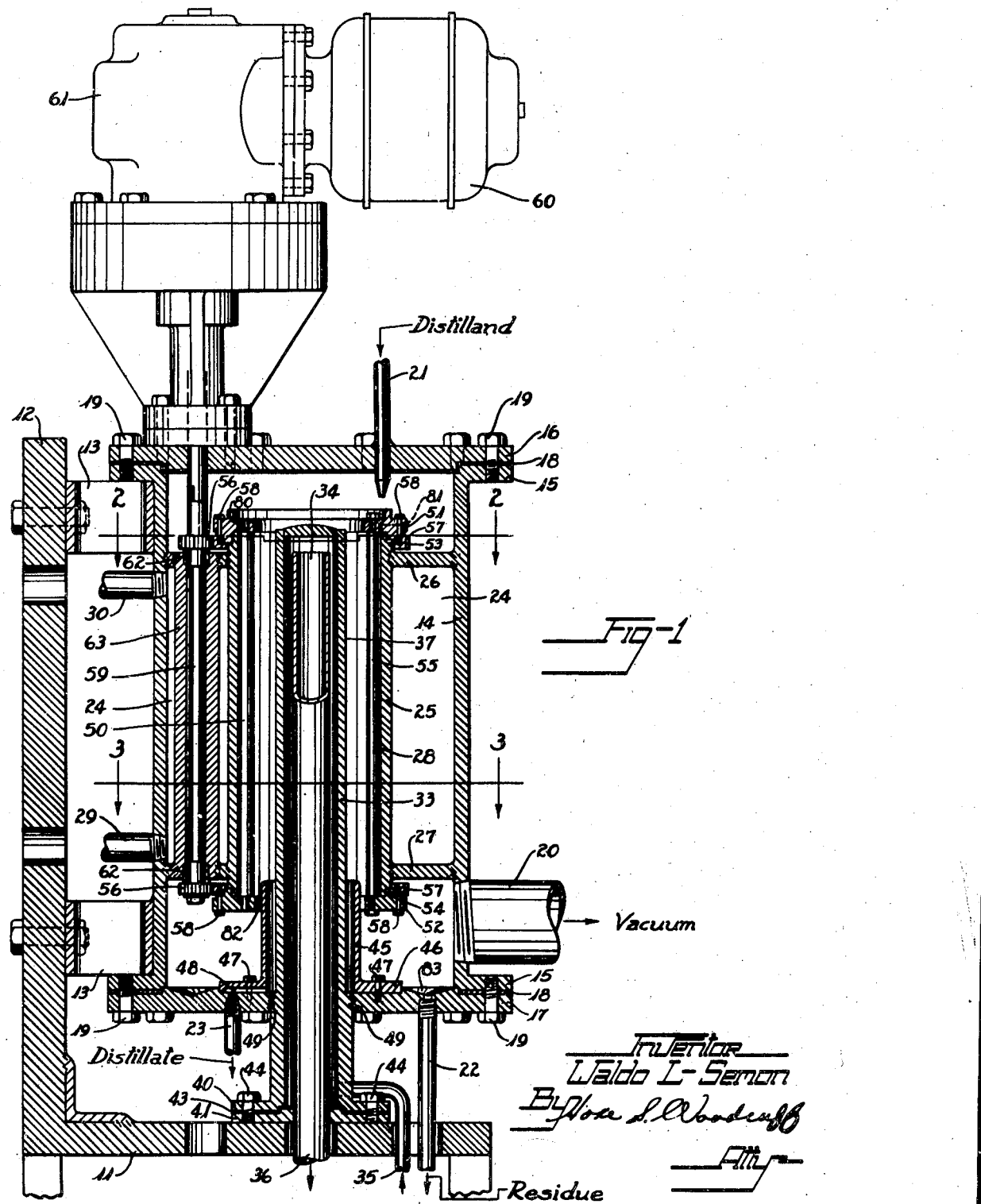

Patented Feb. 1, 1949

2,460,602

UNITED STATES PATENT OFFICE 2,460,602

APPARATUS FOR FILM-TYPE DISTILLATIONS

Waldo L. Semon, Silver Lake, Ohio, assignor to The B. F. Goodrich Company, New York, N. Y., a corporation of New York Application May 4, 1945, Serial No. 591,960

7 Claims. (Cl. 202—205)

This invention relates to distillation apparatus. More particularly the invention relates to apparatus for film-type distillation in which distilland flows upon an evaporation surface in a relatively thin film and is subjected to distillation in the spread out condition, the distillate being collected from an adjacent condensing surface.

Heretofore many forms of apparatus for film-type distillation have been proposed. Several forms of this equipment have found use as laboratory analytical tools and others have been used in the distillation of vitamin oils and other pharmaceuticals in rather limited amounts. The fact that no successful industrial adaptation of film distillation has been made for distillation of low cost materials in the heavy chemicals field is indicative of serious limitations on such equipment from practical engineering and economic view points. Some of the limitations are: extravagance in the use of heat and power, difficulties of adaptation to all-metal design, difficulty in operation, and rather limited output capacity when measured against conventional pot-type stills.

It is therefore an object of the present invention to provide apparatus for film-type distillation which will not be possessed of the above-mentioned defects but which will be adaptable to the separation and purification of a wide range of materials with greater capacity, economy and ease. This and other more detailed objects will appear in the description and discussion to follow.

To facilitate an understanding of the invention, certain phases of film-type distillations will first be briefly discussed and analyzed. Distilling molecules travel from the distilland film to the condensing surface in four stages, the last three of which may be said to occur practically in one continuous movement. The stages are:

(1) Diffusion of the volatile molecules from the body of the distilland to the surface thereof.

(2) Projection of the volatile molecules from the surface of the distilland into the vapor space adjacent the distilland.

(3) Movement of the volatile component across the vapor space or gap to the condensing surface.

(4) Condensation of the volatile molecules on the condensing surface.

Stage 1 takes place very slowly in oils, waxes, greases and many other naturally occurring or chemically prepared mixtures of chemical compounds. In such materials, progress of the volatile molecules toward the surface of the distilland is opposed by the heavy or more inert molecules of the mixture to such an extent that distillation is very slow when natural diffusion is relied on to bring the volatile molecules to the surface for distillation. The diffusional process of stage 1 represents one of the most serious limitations on the output capacity of the film-type distillation equipment.

The rate at which volatile molecules are transferred across the vapor gap, representing travel from stage 2 to stage 4, is a function of many variables some of which are: vapor-gap distance, absolute pressure above the distilland and the quantity of residual gas between the surfaces, size and activity of the distilling molecules, temperatures of the evaporation and condensing surfaces, and surface conditions at both surfaces. These variables are susceptible of variation to meet the demands of each material to be distilled in a manner well known in the art.

I have found that the limitations imposed on film distillation operations by the diffusional process of stage 1 may be minimized and, in practical effect, eliminated by subjecting the film of distilland on the evaporation surface to repeated re-distribution effected by a calendering operation performed, in a preferred embodiment, by means of a series of rolling rods or the like which continuously roll over and calender the film of distilland on the evaporation surface. The calendering rolls or rods repeatedly and successively pick up and re-distribute the film of distilland and so renew its surface as rapidly as it is depleted of the more volatile molecules, with the result that the capacity and efficiency of the still are multiplied many times.

In a preferred installation having a continuously annular evaporation surface surrounding a centrally disposed concentric condensing surface, the distributing means may take the form of a plurality of round rods circumferentially spaced apart at the evaporation surface and making rolling contact therewith, the rods desirably being supported in rotatable annular supporting rings so as to provide a squirrel cage-like structure. When the cage structure is rotated the several rods roll circumferentially over the evaporation surface to distribute and continuously re-distribute the distilland uniformly over the entire evaporation surface in a thin film.

The invention will now be described in greater detail with reference to the accompanying drawings showing certain preferred embodiments thereof. Of the drawings:

Fig. 1 is an elevation in section showing a preferred apparatus for film-type distillation, including rolling-rod means for calendering and distributing the distilland.

Fig. 2 is a sectional view taken along the line 2—2 of Fig. 1.

Fig. 3 is a sectional view taken along the line 3—3 of Fig. 1.

Fig. 4 is a fragmentary elevation in section showing a modification of the apparatus of Figs. 1, 2, 3 which includes additional gear means for positive and individual rotation of the several rolling rods.

Fig. 5 is a sectional view taken along the line 5—5 of Fig. 4.

The preferred type of film distillation equipment shown in Figs. 1 to 3 is desirably mounted in a substantially vertical position in any convenient manner as by resting on a supporting structure 11 and being bolted to a convenient upright structure 12 by spaced apart I-shaped brackets 13, 13. The still comprises a hollow tubular outer shell 14 with end flanges 15, 15 extending outwardly therefrom. A top plate 16 and a bottom plate 17 have recessed annular portions for receiving gaskets 18, 18 and seat against the ends of the outer shell 14 in a vacuum-tight manner at the end flanges 15, 15, the plates being secured in place by stud bolts 19, 19. A vacuum port 20 is desirably located at the bottom of the shell 14 as shown though it may be found advantageous in larger stills to locate a second vacuum port at the top of the still to aid in removing non-condensable materials. The vacuum port or ports communicate with any known means for producing high vacuum, usually of the order of 1 to 10 microns (0.001 to 0.01 mm. Hg).

The still is provided at the top with a distilland delivery or supply pipe 21 and at the bottom with a residue take-off 22 and a distillate take-off 23. The residue and distillate fractions may be led to separate vacuum tight receiving vessels (not shown).

The space within the outer shell 14 is divided into a heating or jacketing space 24 and a vacuum-tight distillation chamber by a concentric annular wall structure 25 and welded-in headers 26, 27. The inside surface 28 of the wall structure 25 serves as an evaporation surface which may be heated to a suitable temperature by circulating steam, heated "Dowtherm," or other heating medium through the jacketing space 24, the heating medium entering and leaving by pipe connections 29, 30.

A tubular condenser may be located concentrically within the annular wall structure 25 in spaced apart concentric relationship with the evaporation surface 28. In a typical case the condensing surface may be disposed approximately 1½ inches from the evaporation surface, although narrower or wider spacings of the two surfaces are not prohibited, the spacing, in general, increasing as the pressure in the system is decreased. The condenser may comprise two tubes or pipes 33, 34, one located concentrically within the other, or it may be composed of a bundle of staggered tubes or of perforate condenser elements, or other known condenser structures. The condenser, when composed of two tubes one located concentrically within the other, desirably is arranged so that the cooling medium flows upwardly through the anular space between the pipes 33, 34, entering at 35, then downwardly through the inner pipe 34, leaving at 36, the outer surface 37 of the pipe 33 serving as the condensing surface. Thus, the cooling medium first comes in contact with the outer pipe 33 at the bottom of the still where the lowest condenser temperature is desirable to prevent volatile molecules from being drawn off through the vacuum port 20.

The two pipes of the condenser may have secured at their lower end portions flanges 40, 41 which may be sealed by a gasket 43, both flanges being secured to the supporting framework 11 as by stud bolts 44, 44 so as to support the condenser tubes in the desired spaced relationship. Also, the outer tube 33 may be welded to the bottom plate 17 as at 49 to provide a vacuum-tight seal.

The condenser is fitted with an annular gutter 45 located concentrically about the bottom of the condenser to collect condensate which flows down the outer surface of the pipe 33. The gutter may be secured to the bottom plate 17 as by an end flange 46 and stud bolts 47, 47. A recessed lead-off 48 in the end flange conducts the distillate to the take-off pipe 23 for removal from the still.

In accordance with the invention, a distilland distributing means is disposed between the surfaces and in association with the evaporation surface 28, the distributing means preferably comprising a plurality of freely rotatable rods or rollers 50, 50 supported by upper and lower spaced-apart annular supporting rings 51, 52 so as to form a squirrel cage-like structure. The supporting rings 51, 52 forming the ends of the cage, rotate on upper and lower recessed bearing surfaces 53, 54 in the respective ends of the annular wall structure 25 and are held together on those bearings by three tie rods 55, 55. Gears 56, 56 drive the top and bottom supporting rings by meshing with ring gears 57, 57 which are secured to the respective supporting rings as by stud bolts 58, 58.

The rolling-rod distilland distributing mechanism is driven as described by the gears 56, 56 mounted on a vertically extending shaft 59 which shaft is driven by a suitable motor 60 through reduction gear mechanism 61. The shaft 59 is supported in bearings 62, 62 carried by the upper and lower headers 26 and 27 and extends through the jacketing space 24 and is isolated therefrom by an enclosing tube 63 integrally secured to the headers 26, 27.

A modified embodiment of the invention is shown in Figs. 4 and 5 in which each of the rolling rods is individually rotated in a positive fashion. The details of this embodiment differ from the embodiment of Figs. 1 to 3 in that the several rollers or rolling rods 50, 50 are provided with upward extensions 71, 71 which project through the upper supporting ring 51 and have gears 72, 72 mounted on the extensions of each of the rods, the gears 72, 72 meshing with a ring gear 73 secured to the top plate 16 as by stud bolts 74, 74. As the cage rotates in the manner previously described, the gears 72 and 73 serve to rotate each rod in a positive fashion, thereby insuring maximum perfection of the calendering action of the rollers.

Unlike prior film distillation equipment, the present apparatus may be constructed throughout of steel or other appropriate low cost, high strength engineering material so as to provide, not only a more efficient still, but also, a less expensive and more rugged and durable still capable of use on a true commercial basis rather than merely on a semi-laboratory basis as has been the case in the past.

In operating either of the embodiments described above, vacuum is applied to the still and the heating medium is turned on. Heating and evacuation are continued until the desired temperature is reached on the evaporation surface and until the desired absolute pressure between the evaporation and condensing surfaces is attained. The distilland, which in the usual case will have been previously subjected to high vacuum stripping and degassing, is introduced to the still through delivery pipe 21. The distilland so delivered is received by an annular groove 80 cut in the top surface of the upper ring 51 from which the distilland flows through holes 81, 81, in the ring 51, the holes 81, 81, being disposed respectively between successive rollers just above the top end of the evaporation surface 28 as may be seen more clearly from Fig. 4. As the distilland flows down the evaporation surface, it is picked up by the rollers and carried around the circumference of the evaporation surface as tiny banks of distilland pushed ahead of the several rollers while being continually spread in characteristic calendering operations.

The film of distilland undergoes progressive distillation as it progresses down the evaporation surface while being repeatedly redistributed by successive rollers. At the bottom end of the evaporation surface, distillation has progressed to a point where a residue remains which has been depleted of the more volatile molecules. The residue escapes from the evaporation surface 28 through the annular space 82 between the lower ring 52 and the gutter 46 and is collected by a recessed groove 83 in the bottom plate 17 and withdrawn from the still through pipe 22.

The distilled molecules are condensed on the condensing surface 37 and flow down the condenser to the annular gutter 45, thence through the recessed lead-off 48 and out of the still through pipe 23 for storage in a receiver tank (not shown).

It is ordinarily necessary to degas the distilland before attempting vacuum distillation of the material. Liquids under usual conditions include quantities of entrapped or dissolved noncondensible gases such as air and adsorbed volatile liquids such as water which, when the material is heated while spread in a film under vacuum, will boil out of the material and seriously overload the vacuum producing apparatus. Further, the non-condensibles frequently will erupt out of the film so explosively as to "splash" or throw distilland across the vapor gap thereby contaminating the distillate with the higher boiling impurities of the distilland. The still of the present invention is exceedingly efficient as a degasser for conducting a preliminary film distillation on a mixture of materials. In utilizing the present apparatus for the degassing distillation rather than the final distillation, the fractions of undistilled residue and of distillate may be run together after one pass through the still and then cycled through the same still or, preferably, a second similar unit in series, for further distillation.

In operating the still, it will be appreciated that small rolling banks of distilland are maintained in front of the several rolling rods as they advance and that each of the rods progressively and continuously bites off small quantities of distilland from its bank and feeds it under the roller so as to spread and smooth it over the evaporation surface. In this respect the rolling rods function like the rolls of a coating calender.

This calendering action reduces the thickness of the distilland film to such a degree that volatile molecules can escape freely from the surface of the film instead of being trapped below its surface and subjected to superheating and consequent violent vaporization and "splashing." The better separation thus attained results in a better opportunity for fractionation. Because of the exceeding thinness of the distilland film and its repeated renewal and redistribution on the evaporation surface as well as over the surface of the rollers themselves, vaporization proceeds at a much higher rate, and at the same time thermal decomposition of heat sensitive materials is minimized since the materials remain at elevated temperatures for a much shorter time than in conventional film type stills. The thinness of the film of distilland and its repeated renewal and redistribution also results in greatly increased heat transfer from the evaporation surface to the distilland film. This increased heat transfer is reflected in a greatly increased thermal efficiency and an increased output capacity. A cold-core still embodying the rolling-rod distributor has both a thermal efficiency and an output capacity of several hundred percent or more greater than the best published data for prior forms of falling film stills.

The still of the present invention will efficiently distill a wide variety of materials, among which are crude dioctyl-phthalate, butyl phthalate, benzyl phthalate, oleic acid, vegetable oil fatty acids, p-isoheptyl diphenylamine, glycol dioleate, olive oil, lubricating oil, cocoanut oil, tricresyl phosphate, and countless other similar materials. Tests also indicate that the present still will handle many other materials not ordinarily thought to be capable of distillation.

The rolling-rod distributor of this invention may be applied to any of the so-called "falling-film" stills, either the "hot-core" or "cold-core" types. It is preferred, however, to use the rolling-rod distributor on the "cold-core" type of still, as illustrated in the drawings, for it is in this type that the full measure of the benefits of the rolling-rod distributor can most effectively be realized. It will also be appreciated that the rolling-rod distributor may be applied to hot and cold-core stills having evaporation and condensing surfaces of varied configurations and dispositions. Thus, a still of the cold-core type may have an outer cylindrical evaporation surface of V-shaped vertical section and an inner condensing surface of inverted conical shape, with rolling rods forming a downwardly converging cage mounted between the surfaces and adjacent the evaporation surface substantially as previously described. Further, it is possible to apply the rolling-rod distributor to stills of the cold or hot-core types having either vertically or horizontally disposed evaporation and condensing surfaces.

The still of this invention is simple and automatic in operation. The rolling-rod distributor is positive in action making visual control unnecessary in operation of the still. With the rolling-rod distributor it is highly improbable that the distilland will gather in rivulets or channels on the evaporation surface or have deposits of charred material built up on the evaporation surface. The still when equipped with a rolling-rod distributor is self-cleaning.

While the invention has been described in detail with reference to operation under conditions of high vacuum of the order of one to ten microns pressure (0.001–0.010 m. m. Hg), I have found that advantageous results also may be obtained by distilling certain more volatile materials at pressures as high as atmospheric. For example, acetone has been distilled in the present apparatus at atmospheric pressure and room temperature. It will accordingly be understood that the invention is not restricted to high vacuum distillation but may be used in conjunction with distillation at varying pressures as high even as atmospheric and higher pressures.

As has been indicated, detailed operating conditions such as temperature of the evaporation surface, temperature of the condensing surface, pressure in the space between the two surfaces, distance between the two surfaces, etc., are not critical and will vary somewhat with different materials being distilled, all of which is well understood in the art.

While the apparatus has been described in considerable detail and with reference to certain specific embodiments and adaptations, it should be understood that the invention is not limited thereto and that variations and modifications therein may be made without departing from the spirit and scope of the invention as defined in the appended claims.

I claim:

1. In film distillation apparatus, a stationary annular evaporation surface and a continuous condensing surface arranged in spaced-apart relationship, a plurality of rotatable rollers mounted for rotational travel between said surfaces and along said evaporation surface, and means for individually and positively rotating said rollers during said travel so as to positively prevent slippage between said rollers and said evaporation surface.

2. In film distillation apparatus, an annular evaporation surface adapted to be covered with distilland, a continuous condensing surface arranged in spaced-apart relationship therewith, a plurality of rotatable rollers arranged in circumferentially spaced-apart relation for rolling contact with the distilland covered surface, rings rotatably supporting said rollers and forming a cage-like structure therewith, means for rotating the cage-like structure as a unit to effect a repeated redistribution of said film, and means for positively rotating the individual rods as the cage-like structure rotates to positively prevent slippage between said rollers and said evaporation surface.

3. Apparatus for film distillation comprising, in combination within a vacuum-tight vessel, a vertically disposed evaporation surface, a continuous condensing surface arranged within said evaporation surface and in spaced-apart relationship therewith, a plurality of freely rotatable rollers mounted for rotational travel in the space between said surfaces for spreading distilland in a thin film on the evaporation surface by a calendering action, an upper ring rotatably supporting the upper ends of said rollers, means for flowing distilland onto said ring at a point in the circumference thereof, apertures in said ring for directing distilland therefrom onto the evaporation surface, means for rotating the ring and roller assembly to effect repeated redistribution of said film on said evaporation surface, means for withdrawing undistilled residue from the evaporation surface, means for withdrawing distillate from the condensing surface, and means for evacuating the space between said surfaces.

4. Apparatus for film distillation comprising, in combination within a vacuum-tight vessel, a vertically disposed cylindrical evaporation surface, a condensing surface arranged within said evaporation surface and in spaced-apart relation therewith, means for heating said evaporation surface, a plurality of round rods rotatably mounted in vertically disposed circumferentially spaced-apart relation for rolling contact with the evaporation surface, upper and lower rings rotatably supporting said rods and forming a cage-like structure therewith, gear means for rotating the cage-like structure about the central axis of said cylindrical evaporation surface, a gear on each of said rods, and ring gear means engaging the said gears on the individual rods so as to effect positive rotation of the individual rods as the cage-like structure rotates, a distilland supply pipe disposed above the said upper ring for flowing distilland onto said ring, feeding apertures in said ring for flowing distilland onto the evaporation surface, means for withdrawing undistilled residue from the evaporation surface, means for withdrawing distillate from the condensing surface, and means for evacuating the space between said surfaces.

5. In film distillation apparatus having stationary condensing and evaporation surfaces in vertically disposed, concentrically spaced-apart relationship, the improvement which comprises a plurality of freely rotatable rollers mounted between said evaporation surface and said condensing surface, but out of contact with said condensing surface, and mounted so as to travel over said evaporation surface and spread distilland thereon in a thin film by a calendering action, an upper ring structure rotatably supporting the upper ends of said rollers, means for rotating the ring and roller assembly to effect repeated distribution of said film on said evaporation surface, means for delivering distilland to said ring at a point in the circumference thereof so that said distilland is distributed around the entire circumference of said evaporation surface during the positive rotational travel of said ring, means for withdrawing distillate from the condensing surface, means for withdrawing undistilled residue from said evaporation surface, and means for evacuating the space between said surfaces.

6. In film distillation apparatus having stationary condensing and evaporation surfaces in vertically disposed, concentrically spaced-apart relationship, the improvement which comprises a plurality of rotatable rollers mounted for rotational travel between said evaporation and condensing surfaces and in contact only with said evaporation surface, and means for individually and positively rotating said rollers during said rotational travel so as to prevent slippage between said rollers and said evaporation surface.

7. In film distillation apparatus having stationary evaporation and condensing surfaces in vertically disposed, concentrically spaced-apart relationship, the improvement which comprises a plurality of rotatable rollers mounted for rotational travel in the space between said surfaces in contact with said evaporation surface, but out of contact with said condensing surface, for spreading distilland in a thin film on the evaporation surface by a calendering action, upper and lower rings rotatably supporting said rollers and forming a cage-like structure therewith, gear means for rotating the cage-like structure about the central axis of said surfaces, gear means to effect positive rotation of the individual rollers as the cage-like structure rotates, means for supplying distilland to the said upper ring, feeding apertures in said upper ring to allow distilland to flow down from said ring to said evaporation surface, means for withdrawing undistilled residue from the evaporation surfaces, means for withdrawing distillate from the condensing surface, and means for evacuating the space between said surfaces.

WALDO L. SEMON.

REFERENCES CITED

The following references are of record in the file of this patent:

UNITED STATES PATENTS

| Number | Name | Date |
|---|---|---|
| 1,200,117 | Johnson et al. | Oct. 13, 1916 |
| 2,180,050 | Hickman | Nov. 14, 1939 |
| 2,224,621 | Voorhees | Dec. 10, 1940 |
| 2,249,526 | Hickman | July 15, 1941 |
| 2,414,215 | Taylor | Jan. 14, 1947 |

OTHER REFERENCES

Publication by Quackenbush et al. in "Industrial and Engineering Chemistry," July 15, 1943, pp. 468–470.